(12) United States Patent
Ricaborda et al.

(10) Patent No.: US 10,042,792 B1
(45) Date of Patent: Aug. 7, 2018

(54) METHOD FOR TRANSFERRING AND RECEIVING FRAMES ACROSS PCI EXPRESS BUS FOR SSD DEVICE

(71) Applicant: BiTMICRO Networks, Inc., Fremont, CA (US)

(72) Inventors: Amor Leo Saing Ricaborda, Taguig (PH); Alain Vincent Villaranda Abitria, Taguig (PH); Rose Fay M. Orcullo, Taguig (PH)

(73) Assignee: BiTMICRO Networks, Inc., Fremont, CA (US)

( * ) Notice: Subject to any disclaimer, the term of this patent is extended or adjusted under 35 U.S.C. 154(b) by 317 days.

(21) Appl. No.: 14/688,748

(22) Filed: Apr. 16, 2015

Related U.S. Application Data

(60) Provisional application No. 61/980,597, filed on Apr. 17, 2014.

(51) Int. Cl.
  *G06F 13/20* (2006.01)
  *G06F 13/28* (2006.01)
  (Continued)

(52) U.S. Cl.
  CPC .......... *G06F 13/28* (2013.01); *G06F 12/0246* (2013.01); *G06F 13/4221* (2013.01); *G06F 2212/7201* (2013.01)

(58) Field of Classification Search
  None
  See application file for complete search history.

(56) References Cited

U.S. PATENT DOCUMENTS

| 4,402,040 A | 8/1983 | Evett |
| 4,403,283 A | 9/1983 | Myntii et al. |

(Continued)

FOREIGN PATENT DOCUMENTS

| JP | 2005142859 A | 6/2005 |
| JP | 2005-309847 | 11/2005 |

(Continued)

OTHER PUBLICATIONS

Office Action for U.S. Appl. No. 13/475,878, dated Jun. 23, 2014.
(Continued)

*Primary Examiner* — Cheng-Yuan Tseng

(57) ABSTRACT

In an embodiment of the invention, a method comprises: transmitting, by a host side, an exchange message protocol (EMP) command frame to a memory device side; informing, by the host side, the memory device side to process the command frame; executing, by the memory device side, the command frame; and transmitting, by the memory device side, an EMP response frame to the host side, in response to the command frame. In another embodiment of the invention, an apparatus comprises: a host side configured to transmit an exchange message protocol (EMP) command frame to a memory device side; wherein the host side is configured to inform the memory device side to process the command frame; wherein the memory device side is configured to execute the command frame; and wherein the memory device side is configured to transmit an EMP response frame to the host side, in response to the command frame.

19 Claims, 6 Drawing Sheets

(51) Int. Cl.
*G06F 13/42* (2006.01)
*G06F 12/02* (2006.01)

(56) References Cited

U.S. PATENT DOCUMENTS

| | | |
|---|---|---|
| 4,752,871 A | 6/1988 | Sparks |
| 4,967,344 A | 10/1990 | Scavezze et al. |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Sinisa Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | Brent Mckay et al. |
| 6,151,641 A | 11/2000 | Herbert |
| 6,215,875 B1 | 4/2001 | Nohda |
| 6,230,269 B1 | 5/2001 | Spies et al. |
| 6,282,587 B1 * | 8/2001 | Priem ............ G06F 13/28 710/23 |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,691,180 B2 * | 2/2004 | Priem ............ G06F 13/28 710/23 |
| 6,728,840 B1 | 4/2004 | Shatil |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischar et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,149,242 B2 * | 4/2012 | Langyel ............ G06T 15/005 345/522 |
| 8,156,279 B2 | 4/2012 | Tanaka et al. |

(56) References Cited

U.S. PATENT DOCUMENTS

| | | |
|---|---|---|
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 4/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 8,990,462 B2 * | 3/2015 | Shim .................. G06F 3/0659 710/11 |
| 9,043,669 B1 | 5/2015 | Bruce et al. |
| 9,087,050 B2 * | 7/2015 | Shim .................. G06F 13/28 |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,317,204 B2 * | 4/2016 | Hahn .................. G06F 3/0659 |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |

(56) References Cited

U.S. PATENT DOCUMENTS

| | | |
|---|---|---|
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pmeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 13/475,878 dated Jun. 23, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Office Action dated Dec. 5, 2014 for U.S. Appl. No. 14/038,684.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.

(56) References Cited

OTHER PUBLICATIONS

Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution, http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Advisory Action for U.S. Appl. No. 14/217,334 dated Jun. 13, 2016.
Office Action for U.S. Appl. No. 14/217,291 dated Jun. 15, 2016.
Office Action for U.S. Appl. No. 14/217,096 dated Jul. 12, 2016.
Notice of Allowance for U.S. Appl. No. 14/217,399 dated Jul. 20, 2016 (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Office Action for U.S. Appl. No. 14/216,937 dated Aug. 15, 2016.
Working Draft American National Standard Project T10/1601-D Information Technology Serial Attached SCSI—1.1 (SAS—1.1), Mar. 13, 2004 Revision 4.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/217,365 dated Oct. 18, 2016.
Office Action for U.S. Appl. No. 14/616,700 dated Oct. 20, 2016.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Advisory Action for U.S. Appl. No. 14/690,305 dated Nov. 25, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Robert Cooksey et al., A Stateless, Content-Directed Data Prefetching Mechanism, Copyright 2002 ACM.
Office Action for U.S. Appl. No. 14/866,946 dated Jul. 27, 2017.
Office Action for U.S. Appl. No. 14/616,700 dated Jun. 2, 2017.
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.

* cited by examiner

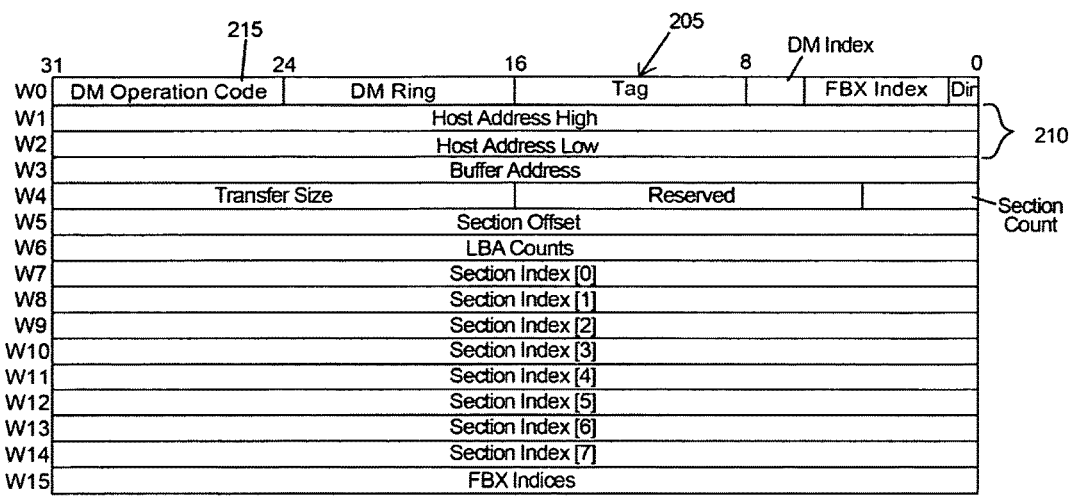
Figure 2: EMP Command Frame Format
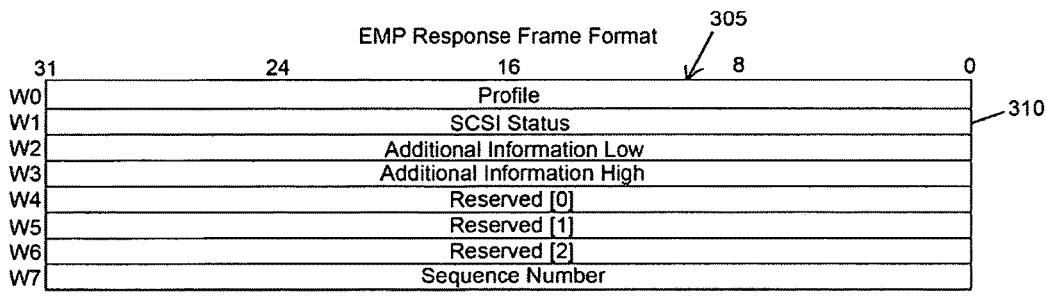
Figure 3: EMP Response Frame Format

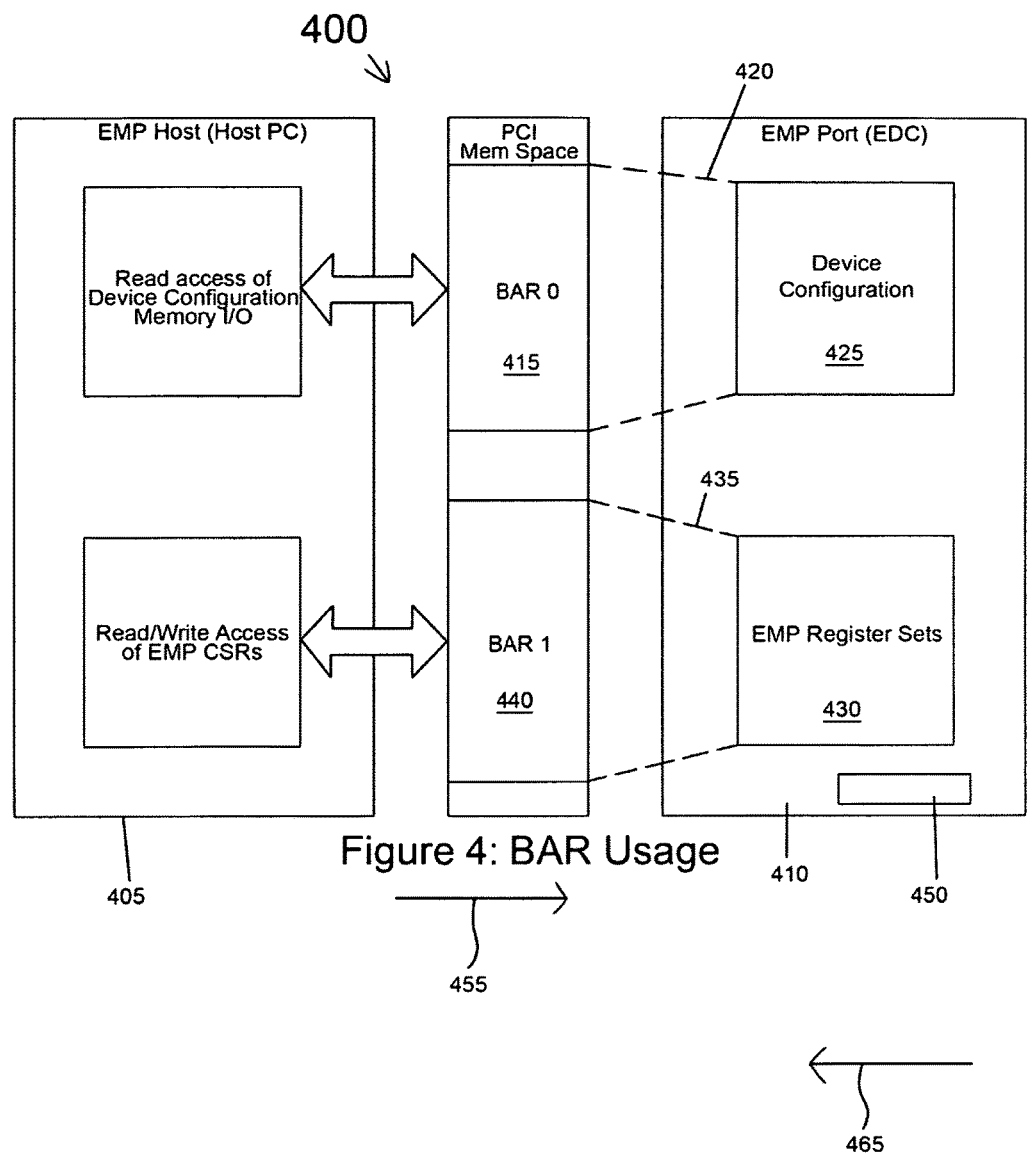
Figure 4: BAR Usage

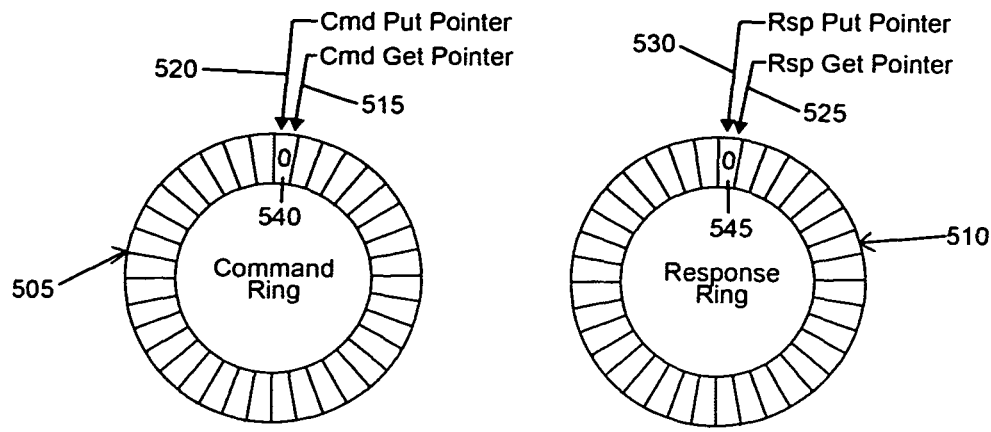
Figure 5: Empty EMP Ring
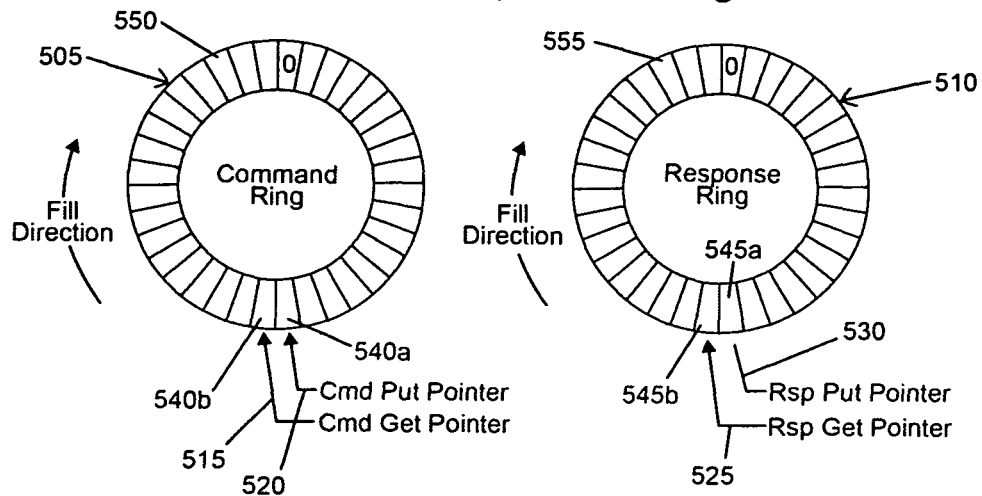
Figure 6: Full EMP Ring

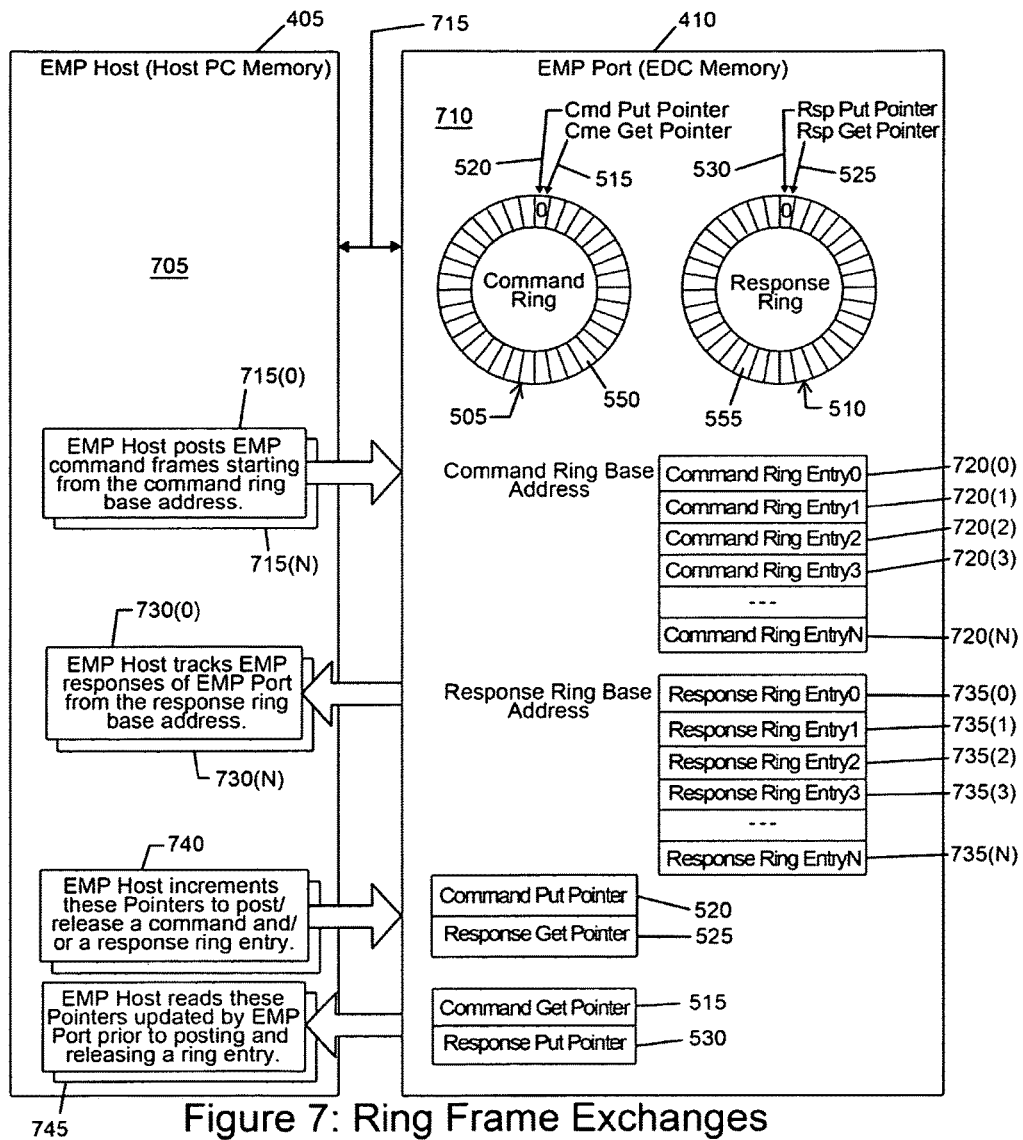
Figure 7: Ring Frame Exchanges

METHOD FOR TRANSFERRING AND RECEIVING FRAMES ACROSS PCI EXPRESS BUS FOR SSD DEVICE

CROSS-REFERENCE(S) TO RELATED APPLICATIONS

This application claims the benefit of and priority to U.S. Provisional Application 61/980,597, filed 17 Apr. 2014. This U.S. Provisional Application 61/980,597 is hereby fully incorporated herein by reference.

FIELD

Embodiments of the invention relate generally to data storage systems. Embodiments of the invention also relate to transmissions of frames of an SSD across a transmission path.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

In a computer system, a data bus transfers data among and between components of the computer system. For example, data is transferred between a Central Processing Unit (CPU) of the computer and a memory or data storage.

Storage devices such as, for example, Solid State Drives (SSDs), can connect to an input/output (I/O) bus of a computer host. One example of such an I/O bus is a Peripheral Component Interconnect Express (PCIe) computer expansion bus or a similar type of computer bus. However, there is a continuing need to overcome the constraints or disadvantages of current conventional systems.

SUMMARY

Embodiments of the invention relate generally to data storage systems. Embodiments of the invention also relate to transmissions of frames of an SSD (solid state drive) across a transmission path.

Embodiments of the invention provide an apparatus and method on how to send SCSI-compliant (Small Computer System Interface compliant) frames of an SSD across a PCIe (Peripheral Component Interconnect Express) bus, when there is no standard protocol yet in PCIe buses for SSD communications.

An embodiment of the invention also provides an exchange message protocol (EMP) that is used to transfer data frames between a host-side and a memory device side (e.g., non-volatile memory device(s)).

In an embodiment of the invention, a method comprises: transmitting, by a host side, an exchange message protocol (EMP) command frame to a memory device side; informing, by the host side, the memory device side to process the command frame; executing, by the memory device side, the command frame; and transmitting, by the memory device side, an EMP response frame to the host side, in response to the command frame.

In another embodiment of the invention, an apparatus comprises: a host side configured to transmit an exchange message protocol (EMP) command frame to a memory device side; wherein the host side is configured to inform the memory device side to process the command frame; wherein the memory device side is configured to execute the command frame; and wherein the memory device side is configured to transmit an EMP response frame to the host side, in response to the command frame.

In yet another embodiment of the invention, an article of manufacture, comprises: a non-transient computer-readable medium having stored thereon instructions that permit a method comprising: transmitting, by a host side, an exchange message protocol (EMP) command frame to a memory device side; informing, by the host side, the memory device side to process the command frame; executing, by the memory device side, the command frame; and transmitting, by the memory device side, an EMP response frame to the host side, in response to the command frame.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

FIG. 2 is block diagram of an Exchange Message Protocol (EMP) command frame format, in accordance with an embodiment of the invention.

FIG. 3 is block diagram of an Exchange Message Protocol (EMP) response frame format, in accordance with an embodiment of the invention.

FIG. 4 is a block diagram that illustrates the usage of base address registers by a host and an endpoint PCI device such as, for example, an embedded disk card (EDC), in accordance with an embodiment of the invention.

FIG. 5 is a block diagram of command ring and a response ring, in accordance with an embodiment of the invention, wherein both rings are currently empty.

FIG. 6 is a block diagram of command ring and a response ring, in accordance with an embodiment of the invention, wherein both rings are currently full.

FIG. 7 is block diagram of a system that shows the interaction between an EMP Host and an EMP Port for EMP frame passing using rings, in accordance with an embodiment of the invention.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

Figure 1:
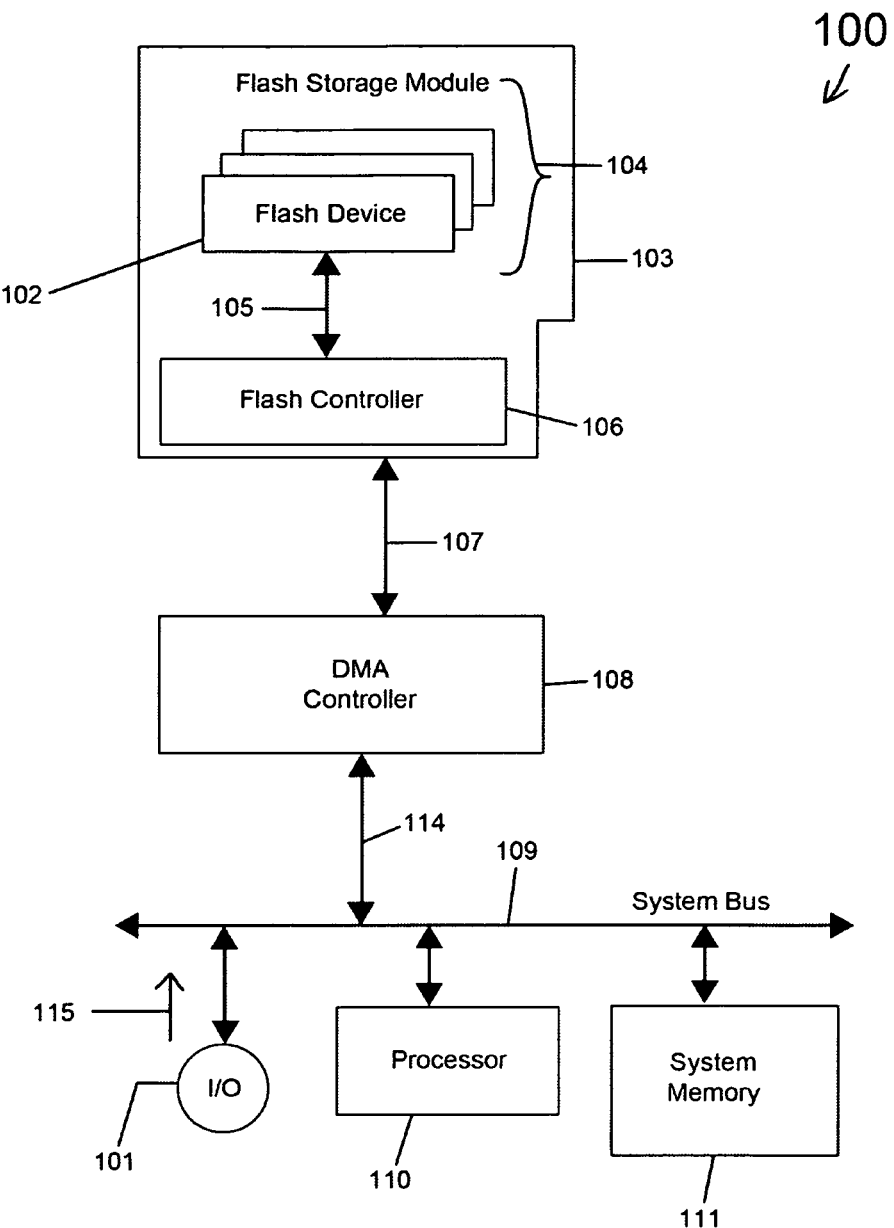
FIG. 1 is a block diagram of an example data storage system (or data storage apparatus) that can include an embodiment of the invention.

FIG. 1 is a block diagram of an example data storage system 100 (or data storage apparatus 100) that can include an embodiment of the invention. Those skilled in the art with the benefit of this disclosure will realize that an embodiment of the invention can be included in other suitable types of computing systems or data storage systems.

When the system 100 has initialized and is under normal operation, a software/program 101 (run by the processor requests for the SSD access), for example, will do a read transaction to read data from one or more non-volatile memory devices 102 in the flash storage module 103 or do a write transaction to write data to one or more non-volatile memory devices 102 in the flash storage module 103. Typically, the one or more memory devices 102 form a memory device array 104 in the flash module 103. The memory device array 104 is coupled via a flash interface 105 to a flash memory controller 106.

The flash storage module 103 is coupled via a flash bus 107 (or memory bus 107) to a Direct Memory Access (DMA) controller 108. The DMA controller 108 is coupled via a DMA bus interface 114 to a system bus 109.

A processor 110, system memory 111, and a software/program 101 (run by processor) are all coupled to the system bus 109. The system 100 can include more than one a software/program 101, more than one processor 110, and/or more than one system memory 111. Additionally or alternatively, the system 100 can include more than one DMA controller 108 and more than one flash storage module 103. In an embodiment of the invention that includes a plurality of flash storage modules 103 and a plurality of DMA controllers 108, wherein each flash storage module 103 is coupled via a respective flash bus 107 to a respective DMA controller 108, the plurality of flash storage modules 103 will form an array (not shown) of flash storage modules 103.

System bus 109 is a conduit or data path for transferring data between DMA controller 108, processor 110, system memory 111, and software/program 101. Processor 110, DMA controller 108, and software/program 101 may access system memory 111 via system bus 109 as needed. System memory 111 may be implemented using any form of memory, such as, for example, various types of DRAM (dynamic random access memory), non-volatile memory, or other types of memory devices.

A request 115 for a memory transaction (e.g., read or write transaction) from software/program 101, typically in the form of an input-output descriptor command, is destined for the processor 110. Descriptor commands are detailed instructions to be executed by an engine or a module. The processor 110 interprets that the input-output descriptor command intends to read from memory devices 102 in the flash storage module 103 or intends to write to memory devices 102 in the flash storage module 103. The processor 110 is in-charge of issuing all the needed descriptors to one or more Direct Memory Access (DMA) controllers 108 to execute a read memory transaction or write memory transaction in response to the request 115. Therefore, the DMA controller 108, flash memory controller 106, and processor 110 allow at least one device, such as a software/program 101, to communicate with memory devices 102 within the data storage apparatus 100. Operating under a program control (such as a control by software or firmware), the processor 110 analyzes and responds to a memory transaction request 115 by generating DMA instructions that will cause the DMA controller 108 to read data from or write data to the flash devices 102 in a flash storage module 103 through the flash memory controller 106. If this data is available, the flash memory controller 106 retrieves this data, which is transferred to system memory 111 by the DMA controller 108. Data obtained during this memory read transaction request is hereinafter named "read data". Similarly, write data provided by software/program 101 will cause the DMA controller 108 to write data to the flash devices 102 through the flash memory controller 106.

A non-volatile memory device 102 in the flash storage module 103 may be, for example, a flash device. This flash device may be implemented by using a flash memory device that complies with the Open NAND Flash Interface Specification, commonly referred to as ONFI Specification. The term "ONFI Specification" is a known device interface standard created by a consortium of technology companies known as the "ONFI Workgroup". The ONFI Workgroup develops open standards for NAND Flash memory devices and for devices that communicate with these NAND flash memory devices. The ONFI Workgroup is headquartered in Hillsboro, Oreg. Using a flash device that complies with the ONFI Specification is not intended to limit the embodiment(s) disclosed herein. One of ordinary skill in the art having the benefit of this disclosure would readily recognize that other types of flash devices employing different device interface protocols may be used, such as protocols that are compatible with the standards created through the Non-Volatile Memory Host Controller Interface (NVMHCI) working group. Members of the NVMHCI working group include Intel Corporation of Santa Clara, Calif., Dell Inc. of Round Rock, Tex., and Microsoft Corporation of Redmond, Wash.

Those skilled in the art with the benefit of this disclosure will realize that there can be multiple components in the system 100 such as, for example, multiple processors, multiple memory arrays, multiple DMA controllers, and/or multiple flash controllers.

FIG. 2 is block diagram of an Exchange Message Protocol (EMP) command frame format, in accordance with an embodiment of the invention. Exchange Message Protocol is a communication protocol used to transmit messages between two PCI devices. The EMP Host acts as the Root Complex PCI device while the EMP Port functions as the Endpoint PCI device. An EMP frame is defined exclusively to convey the message from the EMP Host to the EMP Port or vice versa. The message contains information of the SCSI command issued by the EMP Host and the command status posted by the EMP Port. The EMP frame (command frame and response frame) encapsulates all the necessary command information into one entity. For example, the EMP command frame 205 includes address information 210 of the EMP host which is the root complex PCI device that transmits an EMP command frame to the EMP port. The EMP command frame 205 also includes an SCSI command information 215 issued by the EMP host. This SCSI command information 215 includes the operation code which is executed by the EMP port to permit the EMP port to perform an operation according to the operation code.

As known to those skilled in the art, in a PCIe system, a root complex PCI device connects the processor and memory subsystem to the PCI Express switch fabric that comprises one or more switch devices, and similar to a host bridge in a PCI system, the root complex generates transaction requests on behalf of the processor which is interconnected through a local bus. Root complex functionality may be implemented as a discrete device, or may be it grated with the processor. A root complex may contain more than one PCI Express port and multiple switch devices can be connected to ports on the root complex or cascaded.

FIG. 3 is block diagram of an Exchange Message Protocol (EMP) response frame format, in accordance with an embodiment of the invention. The EMP response frame 305 includes the command status 310 posted by the EMP port which is the endpoint PCI device. An endpoint PCI device (e.g., device 410 in FIG. 4) transmits the response frame 305 in response to receiving a command frame 205 from a host (e.g., host 405 in FIG. 4).

FIG. 4 is a block diagram of a system 400 that illustrates the usage of base address registers by a host 405 and an endpoint PCI device 410 such as, for example, an embedded disk card (EDC), in accordance with an embodiment of the invention. Therefore, the host 405 can also be defined as a host side 405 in the system 400. As an example, a host side 405 can be defined as (or can include) any suitable device. As another example, the host 405 can be, for example, a host computer such as a host personal computer. Another example of the host 405 can be, e.g., the I/O device 101 in FIG. 1.

The endpoint PCI device 410 can be an EMP port 410 such as, for example, an embedded disk card (EDC). An EDC can include the flash storage module 103 in FIG. 1. Therefore, the EMP port 410 can also be defined as a memory device side 410 in the system 400.

As known to those skilled in the art, PCIe BAR mapping involves mapping a PCIe device into the memory-mapped address space (or other I/O address space) of the computer system. This mapping enables the computer system to address PCIe devices. As also known to those skilled in the art, drivers or an operating system can program the Base Address Registers (BARs). During system startup, PCIe devices are usually identified, numbered, and then addressed. The Peripheral Component Interconnect Special Interest Group (PCI-SIG) provides specifications for PCIe and other computer bus technologies.

In FIG. 4, BAR 0 415 is used as a memory window for the EMP Host 405 to access a first memory region 420 in the EMP Port 410, wherein the first memory region 420 contains the configuration settings 425 of the EMP port 410. Typically, the EMP Host 405 accesses the mailbox memory 450 through BAR 0 415.

The EMP Port 410 exposes the sets of registers 430. The EMP Port 410 includes a second memory region 435 that contains the sets of registers 430. The EMP Host 405 can control the behavior and can determine the current status of EMP Port 420 by accessing the memory-mapped view of the EMP registers 430 as viewed by Bar 1 440.

BAR 0 415 AND BAR 1 440 are mapping of the of the EMP port 410 in the memory-mapped address space (or other I/O address space) of the EMP host 405.

The mailbox 450 is a region of memory that the EMP Host 405 uses to pass synchronous commands 455 to the EMP Port 420.

The mailbox 450 is a mailbox memory that resides in the memory of the EDC 420. The memory area used for the mailbox 450 is typically only big enough to hold a single command 455. As discussed above, typically, the EMP Host 405 accesses the mailbox memory 450 through BAR 0 415.

The EMP Host 405 places a mailbox command 455 in the mailbox 450 and this placement of the mailbox command 455 signals (and informs) the EMP Port 420 when there is a command frame 205 (FIG. 2) to process by the EMP Port 410. When the EMP Port 410 has completed processing of the command frame 205, the EMP Port 410 places the mailbox response 465 in the mailbox 450 and this placement of the mailbox response 465 signals (and informs) the EMP Host 405 that there is a response frame 305 (FIG. 3) to process by the EMP Host 405.

This method disclosed in FIG. 4 imposes a serial communication nature to the commands. The EMP Port 410 will only process one mailbox command 455 at a time and will process a command frame 205 until the EMP Port 410 completes processing of the command frame 205.

Mailbox commands 455 are defined to aid in the communication between the EMP Host 405 and EMP Port 410 during initialization and configuration.

Reference is now made to FIG. 5 and FIG. 6.

FIG. 5 is a block diagram of command ring and a response ring, in accordance with an embodiment of the invention, wherein both rings are currently empty. FIG. 6 is a block diagram of command ring and a response ring, in accordance with an embodiment of the invention, wherein both rings are currently full.

In an embodiment of the invention, a ring is a feature that implements asynchronous communication between the EMP Host 405 and the EMP Port 410. The ring allows multiple outstanding commands and responses to be processed.

The actual structure of each ring is composed of two memory arrays, a Command Ring 505 and Response Ring 510. The Command Ring 505 has a set comprising a Command Get pointer 515 and a Command Put pointer 520.

Similarly, the Response Ring 510 has a set comprising a Response Get pointer 525 and a Response Put pointer 530. A Command Ring 505 has a plurality of memory areas 540 for receiving ring values (entries) and a Response Ring 510 has a plurality of memory areas 540 for receiving ring values (entries).

The rings 505 and 510 are allocated in a memory area of the EMP Port 410 (EDC or memory device side 410) in FIG. 4. The memory arrays that form the rings 505 and 510 are treated as circular rings so that when the last element (last ring entry) in the memory array is reached, the next element (next ring entry) to be used (accessed and executed) will be the first element (first ring entry) in the memory array.

The get and put pointers allow the insertion and removal of ring entries. When the get and put pointers contain the same value, the ring is considered empty. In FIG. 5, the Command Ring 505 is considered as empty since the Command get pointer 515 and Command put pointer 520 contain the same value in a given memory area 540 in the Command Ring 505. Similarly, the Response Ring 510 is considered as empty since the Response get pointer 525 and Response put pointer 530 contain the same value in a given memory area 545 in the Response Ring 510.

When the put pointer contains a value immediately before the get pointer, the ring is full. In FIG. 6, since the Command put pointer 520 contains a value in the given memory area 540*a* of Command Ring 505 and the Command get pointer 515 contains a value in the other given memory area 540*b* of Command Ring 505, and since the memory area 540*a* is immediately before the memory area 540*b*, the Command Ring 505 is full.

Similarly, in FIG. 6, since the Response put pointer 530 contains a value in the given memory area 545*a* of Response Ring 510 and the Response get pointer 525 contains a value in the other given memory area 545*b* of Response Ring 510, and since the memory area 545*a* is immediately before the memory area 545*b*, the Response Ring 510 is full.

One or more commands 550 are placed in the Command Ring 505 by EMP Host 405 and the EMP Port 410 is signaled that work is available for the EMP Port 410 to process at least one of the commands 550. The EMP Port 410 will process each command 550 and as the EMP Port 410 completes the processing of each command 550, the EMP Port 410 will put a respective response 555 (corresponding to the processed command 550) in the Response Ring 510 and notify the EMP Host 405 that one or more responses 555 are available. A format of a frame 205 of a command 550 is shown in FIG. 2, while a format of a frame 305 of a response 555 is shown in FIG. 3.

FIG. 7 is block diagram of a system 700 that shows the interaction between an EMP Host 405 and an EMP Port 410 for EMP frame passing using rings, in accordance with an embodiment of the invention. The host 405 includes a host memory 705 while the EMP Port 410 includes an EDC memory 710. The host 405 is coupled via PCIe bus 715 to the EMP Port 410. As noted above, the host 405 can also be defined as a host side 405 and the EMP Port 410 can also be defined as a memory device side 410.

The host 405 posts EMP command frames 715(0) through 715(N), where N is an integer, to the Command Ring 505, where the host 405 will posts the command frames starting from the Command Ring Base Address 720(0) through Command Ring Address 720(N). Therefore, the EMP host 405 posts the command frames 715(0), 715(1), 715(2), 715(3), up to 715(N) to the Command Ring Addresses 720(0), 720(1), 720(2), 720(3), up to 720(N), respectively. The posted command frames are shown as command ring entries in the command ring addresses. For example, the posted command frames are Command Ring Entry0, Command Ring Entry1, Command Ring Entry2, Command Ring Entry3, and up to Command Ring EntryN in command ring addresses 720(0), 720(1), 720(2), 720(3), up to 720(N), respectively.

The host 405 tracks EMP response frames 730(0) through 730(N), where N is an integer, from the Response Ring 510, where the EMP Port 410 will posts the response frames starting from the Response Ring Base Address 735(0) through Response Ring Address 735(N). Therefore, the EMP Port 410 posts the response frames 730(0), 730(1), 730(2), 73*o*(3), up to 730(N) to the Respond Ring Addresses 735(0), 735(1), 735(2), 730(3), up to 730(N), respectively, prior to the EMP Port 410 transmitting the response frames 730(0) to 730(N) to the host 405. The posted response frames are shown as response ring entries in the response ring addresses. For example, the posted response frames are Response Ring Entry0, Response Ring Entry1, Response Ring Entry2, Response Ring Entry3, and up to Response Ring EntryN in response ring addresses 735(0), 735(1), 735(2), 735(3), up to 735(N), respectively.

The EMP host 405 includes a Command Send Module(s) 740 that sends the commands 550 to the EMP Port 410 via PCIe bus 715 and the EMP Port 410 posts these commands 550 in the command ring 505. In an embodiment of the invention, the module(s) 740 can also increment the command put pointer 520 and response get pointer 525. As discussed above with reference to FIG. 3, the EMP host 405 can control the behavior and can determine the current status of the EMP Port 410 by accessing the sets of EMP registers 430. Therefore, the modules(s) 740 in the EMP host 405 can increment the pointers 520 and 525. In another embodiment of the invention, the EMP Port 410 will instead increment the command put pointer 520 and response get pointer 525.

The EMP host 405 includes a Response Receive Module(s) 745 that reads the Command Get pointer 515 and Response Put pointer 530 which have been updated by the EMP Port 410 prior to the EMP Port 410 posting and releasing a ring entry (response 555) via PCIe bus 715. As similarly discussed above, the EMP Port 410 posts the responses 555 in the response ring 510. In an embodiment of the invention, the EMP Port 410 will increment the command get pointer 515 and response put pointer 530 prior to posting and releasing an entry (response) 555 in the response ring 510. In an embodiment of the invention, the EMP Port 410 will post and release a response 555.

Figure 8:
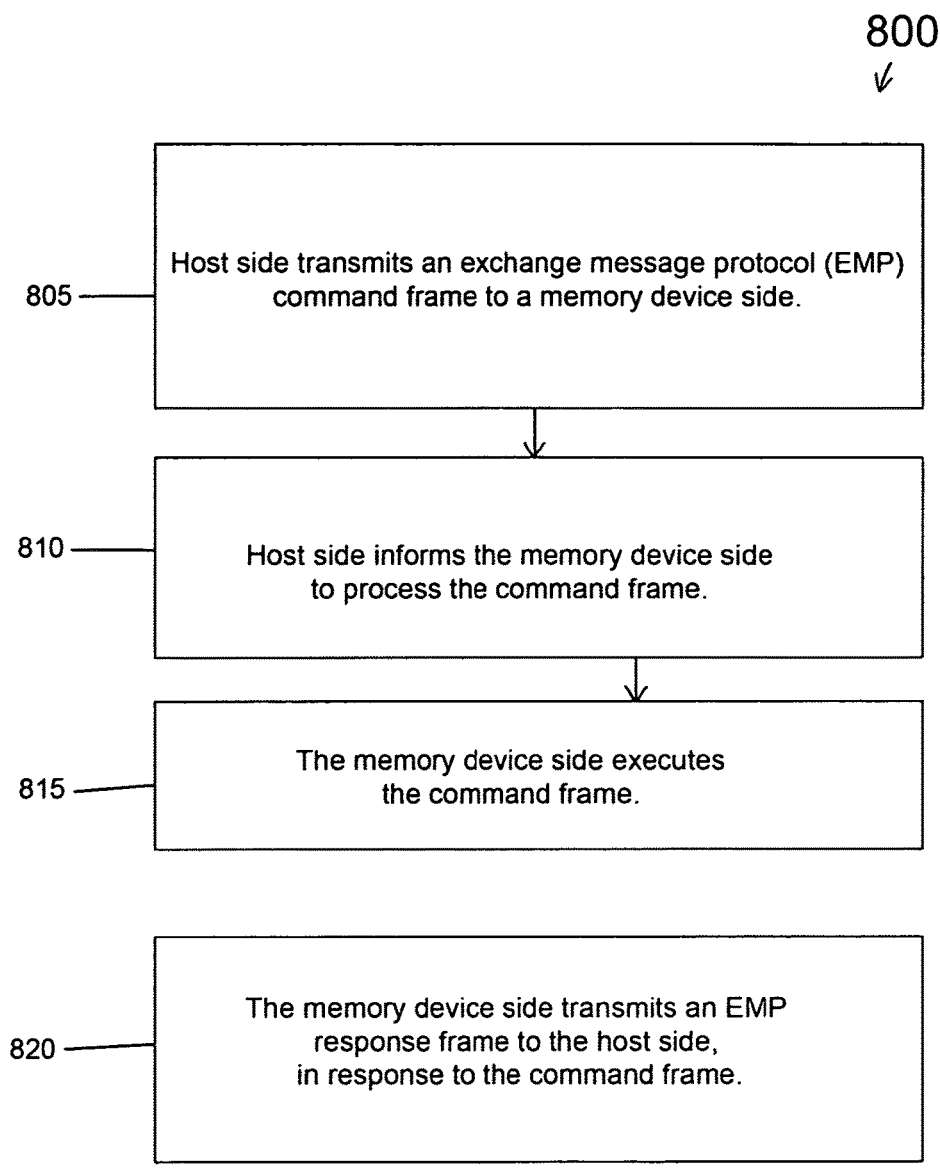
FIG. 8 is a flow diagram of a method in accordance with an embodiment of the invention.

FIG. 8 is a flow diagram of a method 800 in accordance with an embodiment of the invention. At 805, a host side 405 transmits an exchange message protocol (EMP) command frame 205 to a memory device side 410.

At 810, the host side 405 informs the memory device side 410 to process the command frame 205. For example, the host side 405 transmit a mailbox message 455 to the memory device side 410 to inform the memory device side 410 to process the command frame 205. In an embodiment of the invention the operations at 805 occurs prior to the operations at 810. In another embodiment of the invention, the operations at 805 occurs after the operations at 810. In another embodiment of the invention, the operations at 805 and 810 can occur concurrently or can occur in a substantially concurrent manner.

At 815, the memory device side 410 executes the command frame 205.

At 820, the memory device side 410 transmits an EMP response frame 305 to the host side 405, in response to the command frame 205.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
transmitting, by a host side, an exchange message protocol (EMP) command frame to a memory device side, wherein said transmitting further comprises posting, by the host side, the EMP command frame into a first memory array in the memory device side, wherein the host side is coupled by a bus to the memory device side;
informing, by the host side, the memory device side to process the EMP command frame;
executing, by the memory device side, the EMP command frame in response to the EMP command frame being posted into the first memory array;
posting, by the memory device side, an EMP response frame into a second memory array in the memory device side in response to the EMP command frame being executed by the memory device side; and
transmitting, by the memory device side, the EMP response frame to the host side, in response to the EMP response frame being posted into the second memory array;
wherein the memory device side comprises a command ring comprising the first memory array and wherein the memory device side further comprises a response ring comprising the second memory array, and wherein the rings allow processing of multiple outstanding command frames and of multiple outstanding response frames;
wherein the command ring comprises a command get pointer and a command put pointer;
wherein the response ring comprises a response get pointer and a response put pointer;
wherein the host side increments the command put pointer in order to post the EMP command frame in the command ring and increments the response get pointer in order to release an entry in the response ring;
wherein the host side reads the command get pointer and response put pointer with both the command get pointer and the response put pointer having been updated by the memory device side prior to the memory device side posting the EMP response frame in the response ring and releasing an entry in the command ring; and
wherein the memory device side increments the command get pointer and the response put pointer prior to the memory device side posting the EMP response frame in the response ring and releasing the entry in the command ring.

2. The method of claim 1, wherein the memory device side comprises at least one solid state drive (SSD).

3. The method of claim 1, wherein the EMP command frame and the EMP response frame comprise are SCSI-compliant (Small Computer System Interface compliant) frames.

4. The method of claim 1, wherein the EMP command frame and the EMP response frame are transmitted across the bus which comprises a PCIe (Peripheral Component Interconnect Express) bus.

5. The method of claim 1, further comprising:
exposing, to the host side, a first memory region in the memory device side, wherein the first memory region comprises configuration settings of the memory device side.

6. The method of claim 1, further comprising:
exposing, to the host side, a second memory region in the memory device side, wherein the second memory region comprises at least a set of registers of the memory device side.

7. The method of claim 1, further comprising:
placing, by the host side, a mailbox command in a mailbox memory of the memory device side, in order to inform the memory device side of the EMP command frame for processing by the memory device side;
wherein the mailbox memory is sized to hold the mailbox command.

8. The method of claim 7, further comprising:
placing, by the memory device side, a mailbox response in the mailbox memory after the memory device side has processed the EMP command frame.

9. An apparatus, comprising:
a host side configured to transmit an exchange message protocol (EMP) command frame to a memory device side, wherein the host side is configured to post the EMP command frame into a first memory array in the memory device side, wherein the host side is coupled by a bus to the memory device side;
wherein the host side is configured to inform the memory device side to process the EMP command frame;
wherein the memory device side is configured to execute the EMP command frame in response to the EMP command frame being posted into the first memory array;
wherein the memory device side is configured to post an EMP response frame into a second memory array in the memory device side in response to the EMP command frame being executed by the memory device side; and wherein the memory device side is configured to transmit the EMP response frame to the host side, in response to the EMP response frame being posted into the second memory array;

wherein the memory device side comprises a command ring comprising the first memory array and wherein the memory device side further comprises a response ring comprising the second memory array, and wherein the rings allow processing of multiple outstanding command frames and of multiple outstanding response frames;

wherein the command ring comprises a command get pointer and a command put pointer;

wherein the response ring comprises a response get pointer and a response put pointer;

wherein the host side increments the command put pointer in order to post the EMP command frame in the command ring and increments the response get pointer in order to release an entry in the response ring;

wherein the host side reads the command get pointer and response put pointer with both the command get pointer and the response put pointer having been updated by the memory device side prior to the memory device side posting the EMP response frame in the response ring and releasing an entry in the command ring; and wherein the memory device side increments the command get pointer and the response put pointer prior to the memory device side posting the EMP response frame in the response ring and releasing the entry in the command ring.

10. The apparatus of claim 9, wherein the memory device side comprises at least one solid state drive (SSD).

11. The apparatus of claim 9, wherein the EMP command frame and the EMP response frame comprise are SCSI-compliant (Small Computer System Interface compliant) frames.

12. The apparatus of claim 9, wherein the EMP command frame and the EMP response frame are transmitted across the bus which comprises a PCIe (Peripheral Component Interconnect Express) bus.

13. The apparatus of claim 9, wherein the host side is exposed to a first memory region in the memory device side, wherein the first memory region comprises configuration settings of the memory device side.

14. The apparatus of claim 9, wherein the host side is exposed to a second memory region in the memory device side, wherein the second memory region comprises at least a set of registers of the memory device side.

15. The apparatus of claim 9, wherein the host side is configured to place a mailbox command in a mailbox memory of the memory device side, in order to inform the memory device side of the EMP command frame for processing by the memory device side
wherein the mailbox memory is sized to hold the mailbox command.

16. The apparatus of claim 15, wherein the memory device side is configured to place a mailbox response in the mailbox memory after the memory device side has processed the EMP command frame.

17. An article of manufacture, comprising:
a non-transitory computer-readable medium having stored thereon instructions operable to permit an apparatus to perform a method comprising:
transmitting, by a host side, an exchange message protocol (EMP) command frame to a memory device side, wherein said transmitting further comprises posting, by the host side, the EMP command frame into a first memory array in the memory device side, wherein the host side is coupled by a bus to the memory device side;
informing, by the host side, the memory device side to process the EMP command frame;
executing, by the memory device side, the EMP command frame in response to the EMP command frame being posted into the first memory array;
posting, by the memory device side, an EMP response frame into a second memory array in the memory device side in response to the EMP command frame being executed by the memory device side; and
transmitting, by the memory device side, the EMP response frame to the host side, in response to the EMP response frame being posted into the second memory array;

wherein the memory device side comprises a command ring comprising the first memory array and wherein the memory device side further comprises a response ring comprising the second memory array, and wherein the rings allow processing of multiple outstanding command frames and of multiple outstanding response frames;

wherein the command ring comprises a command get pointer and a command put pointer;

wherein the response ring comprises a response get pointer and a response put pointer;

wherein the host side increments the command put pointer in order to post the EMP command frame in the command ring and increments the response get pointer in order to release an entry in the response ring;

wherein the host side reads the command get pointer and response put pointer with both the command get pointer and the response put pointer having been updated by the memory device side prior to the memory device side posting the EMP response frame in the response ring and releasing an entry in the command ring; and wherein the memory device side increments the command get pointer and the response put pointer prior to the memory device side posting the EMP response frame in the response ring and releasing the entry in the command ring.

18. The article of manufacture of claim 17, wherein the EMP command frame and the EMP response frame are transmitted across the bus which comprises a PCIe (Peripheral Component Interconnect Express) bus.

19. The article of manufacture of claim 17, wherein the method further comprises:
placing, by the host side, a mailbox command in a mailbox memory of the memory device side, in order to inform the memory device side of the command frame for processing by the memory device side;
wherein the mailbox memory is sized to hold the mailbox command.

* * * * *